(12) United States Patent  
McDonald (10) Patent No.: US 7,606,804 B2  
(45) Date of Patent: Oct. 20, 2009

(54) SYSTEM AND METHOD FOR INFORMATION MANAGEMENT IN A DISTRIBUTED NETWORK

(75) Inventor: James Gregor McDonald, Middlesex (GB)

(73) Assignee: EMC Corporation, Hopkinson, MA (US)

( * ) Notice: Subject to any disclaimer, the term of this patent is extended or adjusted under 35 U.S.C. 154(b) by 406 days.

(21) Appl. No.: 11/079,560

(22) Filed: Mar. 14, 2005

(65) Prior Publication Data

US 2005/0203873 A1    Sep. 15, 2005

Related U.S. Application Data

(60) Provisional application No. 60/553,324, filed on Mar. 15, 2004.

(51) Int. Cl.
*G06F 7/00* (2006.01)
*G06F 17/30* (2006.01)

(52) U.S. Cl. .............................. 707/10; 707/8; 709/224; 709/225

(58) Field of Classification Search ............... 707/202, 707/3, 10, 8, 9; 709/224, 205, 225, 202, 709/223, 219; 714/26
See application file for complete search history.

(56) References Cited

U.S. PATENT DOCUMENTS

| 6,012,152 | A  | * | 1/2000 | Douik et al. ................... 714/26 |
| 6,463,430 | B1 | * | 10/2002 | Brady et al. ................... 707/3 |
| 6,584,466 | B1 |   | 6/2003 | Serbini et al. |
| 2002/0152305 | A1 | * | 10/2002 | Jackson et al. ............... 709/224 |
| 2003/0130983 | A1 |   | 7/2003 | Rebane et al. |
| 2004/0054764 | A1 | * | 3/2004 | Aderton et al. .............. 709/223 |
| 2005/0033777 | A1 | * | 2/2005 | Moraes et al. .............. 707/202 |
| 2005/0132304 | A1 | * | 6/2005 | Guido et al. ................. 715/853 |

* cited by examiner

*Primary Examiner*—John E Breene  
*Assistant Examiner*—Giovanna Colan  
(74) *Attorney, Agent, or Firm*—DLA Piper LLP (US)

(57) ABSTRACT

A system and method of information management for a distributed network of data sources comprises, in one example, obtaining information from at least one data source and storing the information in at least one data structure in accordance with previously stored configuration parameters. The system and method further includes receiving a query for selected information of the stored information and processing the stored information based on the query to generate an output representing the selected information.

47 Claims, 11 Drawing Sheets

Initialisation of the Control Thread

Fig 11

Main Operation of the Control Thread

Fig 12

Operation of the Worker Thread

SYSTEM AND METHOD FOR INFORMATION MANAGEMENT IN A DISTRIBUTED NETWORK

CROSS-REFERENCE TO RELATED APPLICATIONS

This application is related to and claims priority from provisional Patent Application Ser. No. 60/553,324 filed Mar. 15, 2004, the entire disclosure of which is incorporated by reference herein.

FIELD OF THE INVENTION

The invention relates generally to information management and more particularly to systems and methods for information management in a distributed network of data sources.

BACKGROUND OF THE INVENTION

Information management technology, including relational databases and structured query language (SQL) applications, has led to many productivity enhancements and, in turn, competitive advantages for modern business enterprises. As such, there is a continuing demand for information management applications that may foster further productivity enhancements. Particularly, there is currently a demand for applications that may autonomously identify and provide solutions for various performance and capacity management issues.

Information management applications are particularly useful for medium to large scale business enterprises that may include diverse and remote operational centers. Typically, a business enterprise may utilize several information management systems to manage information from servers that are related to one or more operational centers. As such, an information management application that may obtain information from distributed servers and then extrapolate trends utilizing selected information to provide for productivity improvements would be advantageous.

Additionally, it would be advantageous for such an application to have a plurality of input and output interfaces for importing and exporting information between distributed servers and client terminals. Further, it would be advantageous for such an application to employ a standardized coding system for importing and exporting information. The application should be compatible with various other applications, including third party or independent software vendor (ISV) applications that may be remotely located at various distributed systems.

SUMMARY

Various embodiments include a method of information management for a distributed network of data sources. The method includes obtaining information from at least one data source and storing the information in at least one data structure in accordance with previously stored configuration parameters. The method further includes receiving a query for selected information of the stored information and processing the stored information based on the query to generate an output representing the selected information.

BRIEF DESCRIPTION OF THE DRAWINGS

A more complete appreciation of the various embodiments will be readily obtained by reference to the following detailed description when considered in conjunction with the accompanying drawings, wherein.

DETAILED DESCRIPTION

Embodiments of the invention include apparatuses and methods for implementing an information management system for a distributed network. In one embodiment the information management system is designed to help a user to identify and fix performance and capacity management related issues within, for example, a large business enterprise. It should be understood that the apparatuses and methods described herein may be implemented by any combination of hardware, software and/or firmware.

In one embodiment, the system comprises a server computer. However, it should be noted that the system may also comprise one or more devices such as, without limitation, a processor, a microprocessor, a personal computer, such as a laptop, palm PC, desktop or workstation; a network server; a mainframe; an electronic wired or wireless device, such as, for example, a telephone; an interactive television or electronic transceiver box attached to a television, such as, for example, a television adapted to be connected to the Internet; a cellular telephone; a personal digital system; electronic pager and digital watch. Application software implementing the various methods described herein may run on the server computer and/or at a location external to the server computer.

The server computer may represent one device in a network of devices. The term "network" as used herein should be broadly construed to comprise any wired or wireless network, or any combination wired/wireless network, such as, for example, a telephone or cellular telephone network, an internal business network, cable/DSL/T1 networks, satellite networks, the Internet or world wide web, an intranet, or an extranet, etc.

As described below, the various components of the system communicate with each other via communication interfaces. For example, a communication interface may be a wired communications medium such as, for example, a standard serial, universal serial bus (USB), or IEEE-1394 "firewire" port connection. In another example, a communication interface may represent a wireless communication medium such as, for example, a wireless transmitter/receiver arrangement such as a cellular telephone network or a wi-fi network. A communication interface may also be a public or semi-private network connection such as those networks described above (e.g., a telephone or cellular telephone network, internal business network, cable/DSL/T1 networks, satellite network, the Internet or world wide web, an intranet, or an extranet, etc.).

Figure 1:
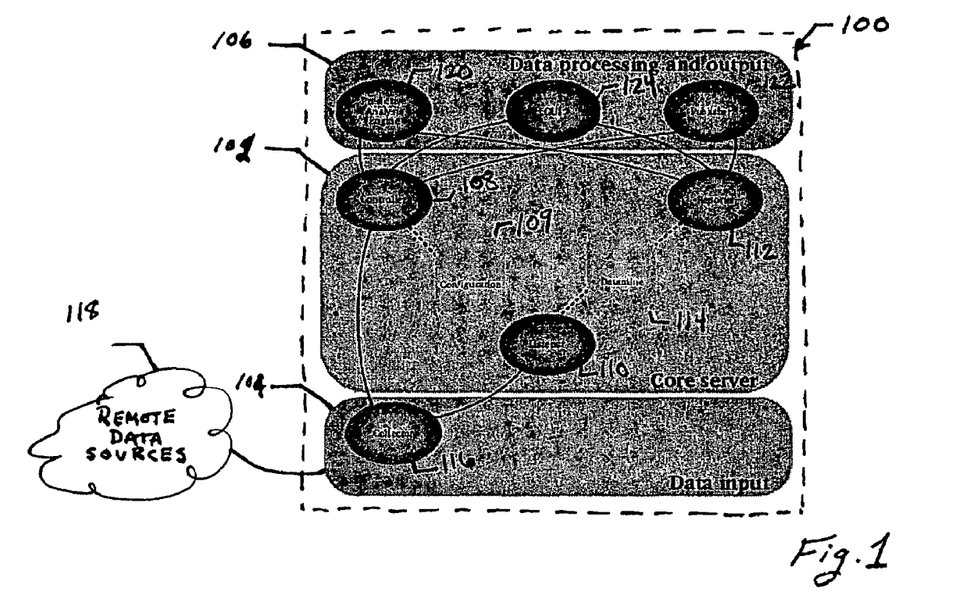
FIG. 1 illustrates a block diagram of an information management system according to embodiments of the invention.

FIG. 1 illustrates an overview block diagram of an information management system 100 according to embodiments of the invention. Various components for implementing the system, along with their internal communications and external interfaces are shown. In one embodiment, the dotted lines in FIG. 1 represent binary communication interfaces while the solid lines represent XML communication interfaces. However, the various embodiments described herein may be implemented by any type and/or combination of communication interface types as may be desired.

It should be noted that while the various components are illustrated as being associated with a particular logical grouping, the information management system is not limited thereto. The components for implementing the various processes may be distributed, for example, across physically separated servers and/or operating systems in any variety of configurations.

As such, the information management system 100 includes three logical layers that may be characterized by function. The logical layers include a core server 102, a data input layer 104 and a data processing/output layer 106. The core server 102 comprises components that interact with and manage data storage devices for implementing various information management processes. The data input layer 104 includes one or more components for collecting data from local and/or remote data sources for storage at the core server 102. In turn, the data processing/output layer 106 includes components for processing the collected data stored in the core server 102 and generating a human or machine relevant output. The operation of the core server and its interaction with the input and data processing/output layers comprises a system for collecting, managing and processing data from data sources.

In order to illustrate the operation of the system as a whole and its interoperability with various compatible systems, the following will describe the components that generally comprise the three logical layers. While various processes and functionalities are described herein as being embodied by discrete components, it should be noted that the distinctions made between the components are merely for ease of understanding. One or more hardware, software and/or firmware components may be operable to perform one or more of the processes and functionalities described herein without departing from the spirit and scope of the invention.

We turn now to a description of the various core server components according to embodiments of the invention. In the various embodiments, the core server 102 may comprise one or more of the components operable to perform one or more of the operations described below. In addition, the core server 102 may be comprised of additional components for performing operations in addition to those mentioned herein, including, for example, third party or proprietary components that may be customized to perform various additional operations.

In various embodiments, the components of the core server 102 share common features of operation. For example, in one embodiment all of the core server components include XML interfaces for communication with the data input and data processing/output layers, 104 and 106 respectively. XML interfaces have well defined APIs that allow for the core server components to interact with the input and data processing/output layers as well as third party and proprietary applications. Alternatively, the core server processes may employ a compressed format of XML if the amount of data to send exceeds a predetermined threshold. As such, large amounts of data may be communicated without requiring the bandwidth necessary for standard XML transmissions.

Although the core server 102 in FIG. 1 illustrates only one controller 108 with a configuration database 109, a listener 110 and a reporter 112, it should be understood that each component may in fact represent multiple components in communication with the centralized data mine 114 and, as a result, run multiple processes separately or concurrently. As such, the core server components are operable to run functionally or geographically separated processes in large data source environments without degrading the functionality of any particular component. Further, all of the core server processes may run on top of a database abstraction layer. For example, database rows may be represented by information objects rather than database rows to provide a single interface to store and retrieve persistent data. This allows for the core server processes to work with multiple databases and to expand its database support when required without requiring changes to the main code base.

As mentioned above, the core server includes a controller 108. The controller 108 is a data store for maintaining various control and configuration data. In one embodiment, the controller 108 provides an open API for both setting and obtaining information to allow for flexibility when connecting with the system as well as to third party or in-house applications.

Further, the design of the controller 108 may allow for the storage of additional, perhaps user-defined information, which can be accessed through a number of methods such as, for example, aggregate or first-match (bubble-up). With the aggregate method, the information returned is the combination of all sets of control directives found from the selected node up to the top of the tree. With the bubble-up method, the information returned is the first set of control directives found from the selected node up to the top of the tree. The controller 108 is in communication with a collector from the data input layer 104 (described below) for setting parameters on gathering data. For example, the controller 108 may contain control and configuration information to provide a hierarchical view of a particular data output and/or multiple views of a particular data output so as to separate the data for various divisions of a particular enterprise. In one embodiment, the control and configuration information may include user-defined attributes that may be utilized to transpose existing or external data. The control and configuration information may include security information, user customization information and information for the operation of output generating components such as, for example, a publisher or a predictive analysis engine, which will be described in detail below.

The controller 108 may further store information regarding the type and structure of data that is available at a given time within a centralized data mine 114. As such, in one embodiment, the controller 108 is queried by all processes requiring information from the data mine 114 as part of their operation.

In various embodiments, the controller 108 may represent servers, switches, storage arrays, and other physical devices found in a large environment; represent business, functional, geographical, and other logical groupings that exist in a complex environment through suitable group elements; link physical devices with elements of a logical grouping to provide a hierarchical structure to the physical devices; have multiple different views of the same physical devices to provide multiple hierarchical structures as required by different entities using the same information; represent configuration information, receive data-gathering requests and other control directives that may be supplied to nodes; assign control directives to physical devices and/or logical group elements; and retrieve control directives for a particular physical device or logical group element.

The controller 108 may further include the ability to represent databases, clusters, and other logical devices found in a large environment; extend the abilities of physical devices to logical devices; represent call-out lists, response documentation, and other ownership information; assign ownership information to physical devices and logical group elements; and retrieve ownership information most specific to a particular physical device or logical group element.

A "node" is the fundamental unit within the controller 108. The controller 108 may store information on the hierarchy of nodes that make up an enterprise. For example, such nodal hierarchies may be utilized to control both the data gathering and reporting operations. As such, the controller 108 may provide a user with the ability to customize their data output and/or the data output of users within their purview without compromising the ability of other users to do the same.

Figure 2:
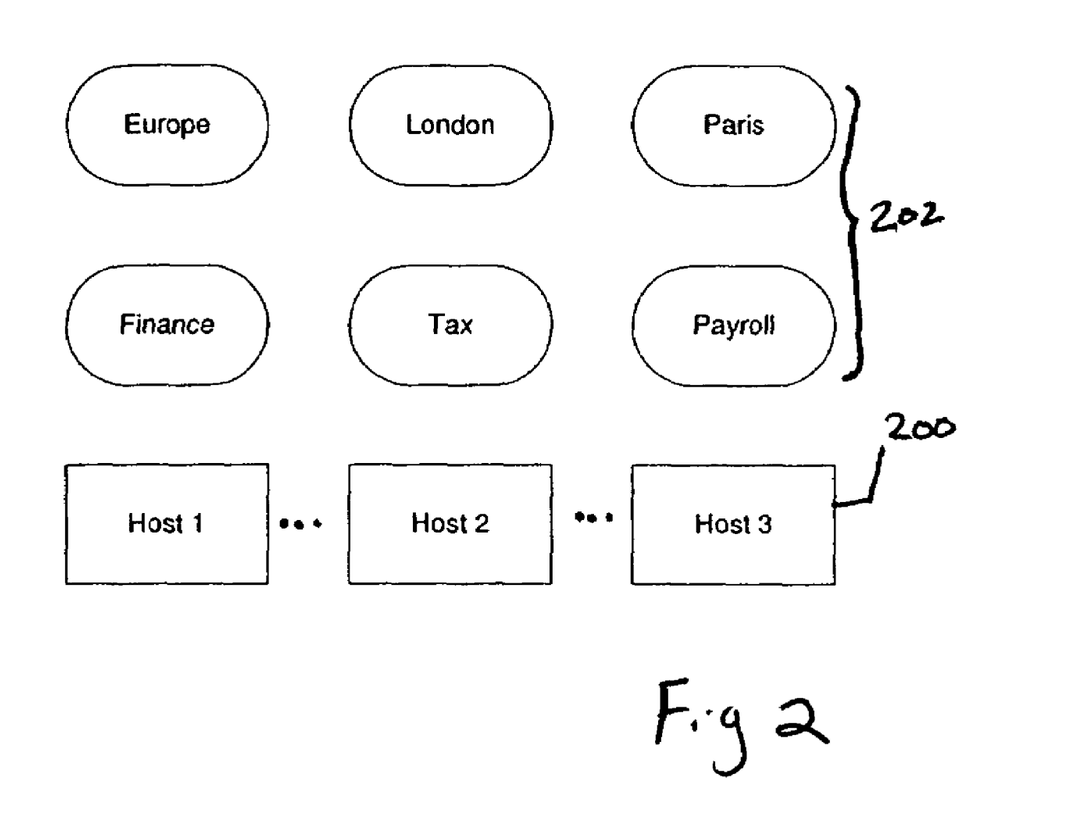
FIG. 2 illustrates a block diagram of a controller module architecture according to embodiments of the invention.

A node can represent either a physical device, a logical device, or a logical group. For example, in FIG. 2, physical devices 200 are shown in square boxes and logical groups 202 are shown as rounded boxes. A node is identified by a name that is unique throughout the entire data store of the controller 108.

A "view" is a set of nodes that are linked together in a set of parent-child relationships to form a hierarchy. Multiple, independent views may exist within the same Controller 108. Linking two nodes within a single view may be performed in accordance with rules predetermined by a user.

Figure 3:
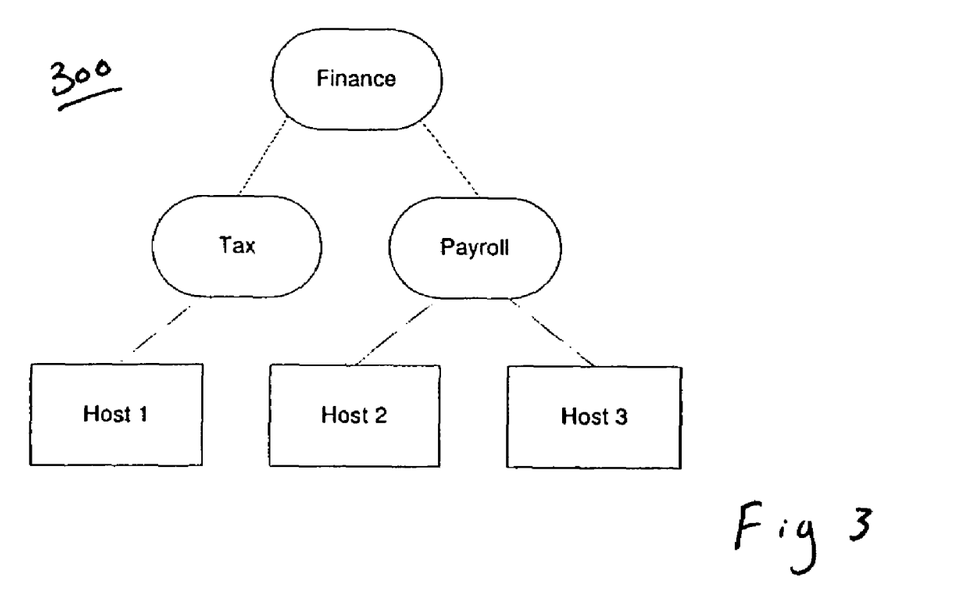
FIG. 3 illustrates another block diagram of a controller module architecture according to embodiments of the invention.
Figure 4:
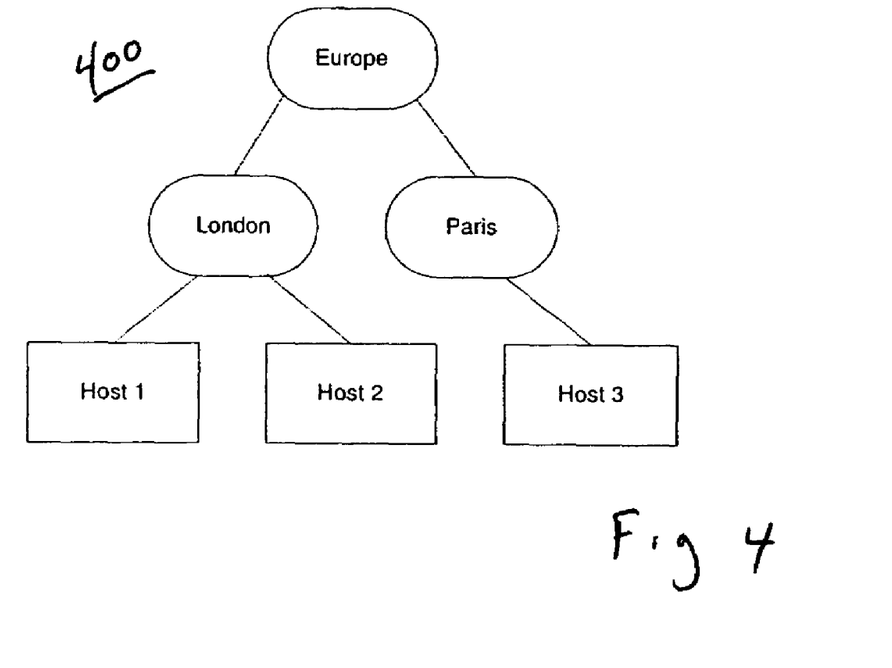
FIG. 4 illustrates another block diagram of a controller module architecture according to embodiments of the invention.

For example, FIGS. 3 and 4 show two separate views that contain the same physical devices. FIG. 3 shows a hypothetical Finance division of a company 300, with two sub-divisions of Tax and Payroll. Host 1 is part of the Tax division, and Hosts 2 and 3 are part of the Payroll division.

FIG. 4 shows a geographical view 400 of the company in FIG. 3, with London and Paris within Europe. Hosts 1 and 2 are in London, and Host 3 is in Paris.

Figure 5:
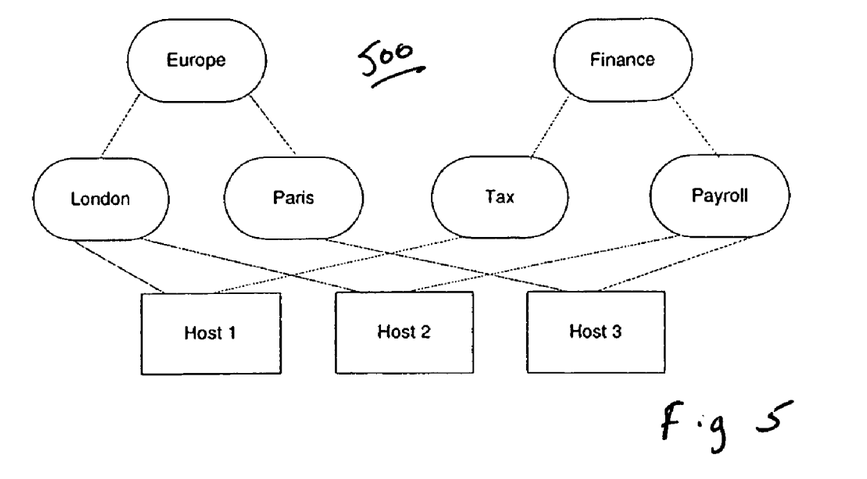
FIG. 5 illustrates another block diagram of a controller module architecture according to embodiments of the invention.

FIG. 5 shows how the two separate views 500 of FIGS. 3 and 4 co-exist independently within the controller 108, linking the same physical devices but remaining separate from each other. Although not shown here, groups can also be shared between views as they are just another type of node.

Figure 6:
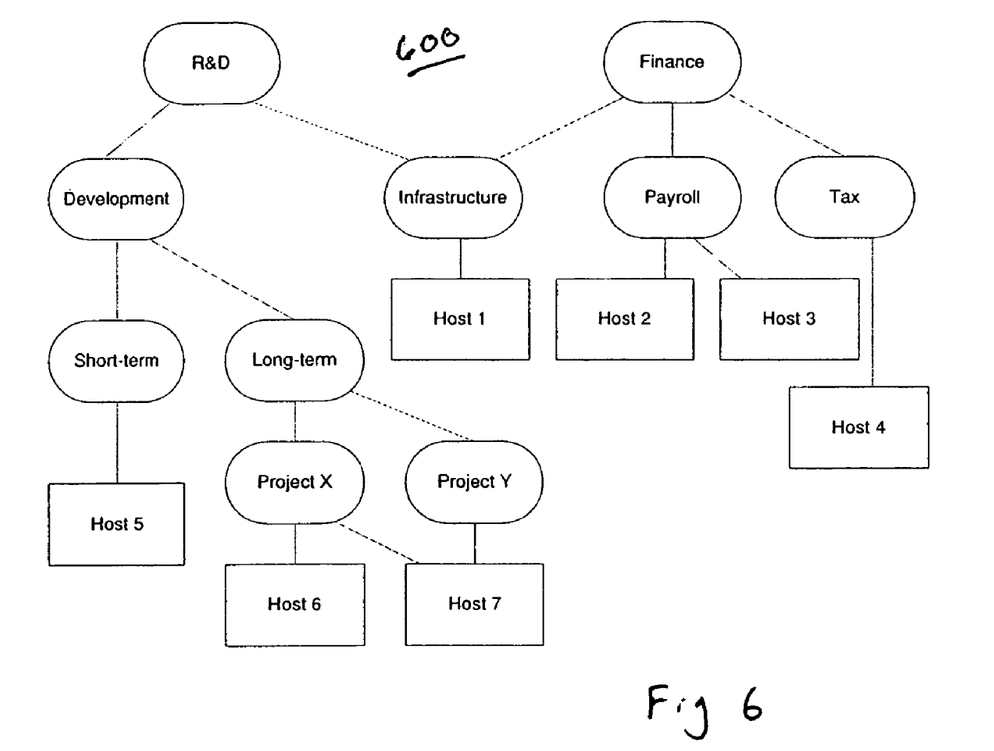
FIG. 6 illustrates another block diagram of a controller module architecture according to embodiments of the invention.

In another example, FIG. 6 shows a more complex version of a divisional view 600 wherein Host 7 is a child of both Project X and Project Y, and that Finance and R&D are both parents of the Infrastructure group. FIG. 6 is representative of the type of complex mapping that exists within larger corporations, and provides a way to logically represent newer types of server architectures that are appearing on the market such as, for example, virtual hosts and multi-node clusters.

In one embodiment, a user may add extended information to nodes through the use of "assignation." Direct assignation is when control directives are attached to nodes to augment the information that is available from them. Indirect assignation is when control directives are attached to groups such that the nodes beneath them obtain the effect of direct assignation. A combination of direct and indirect assignation within a view allows a user the ability to provide different levels of granularity with control directives as required in an environment that has many nodes.

Figure 7:
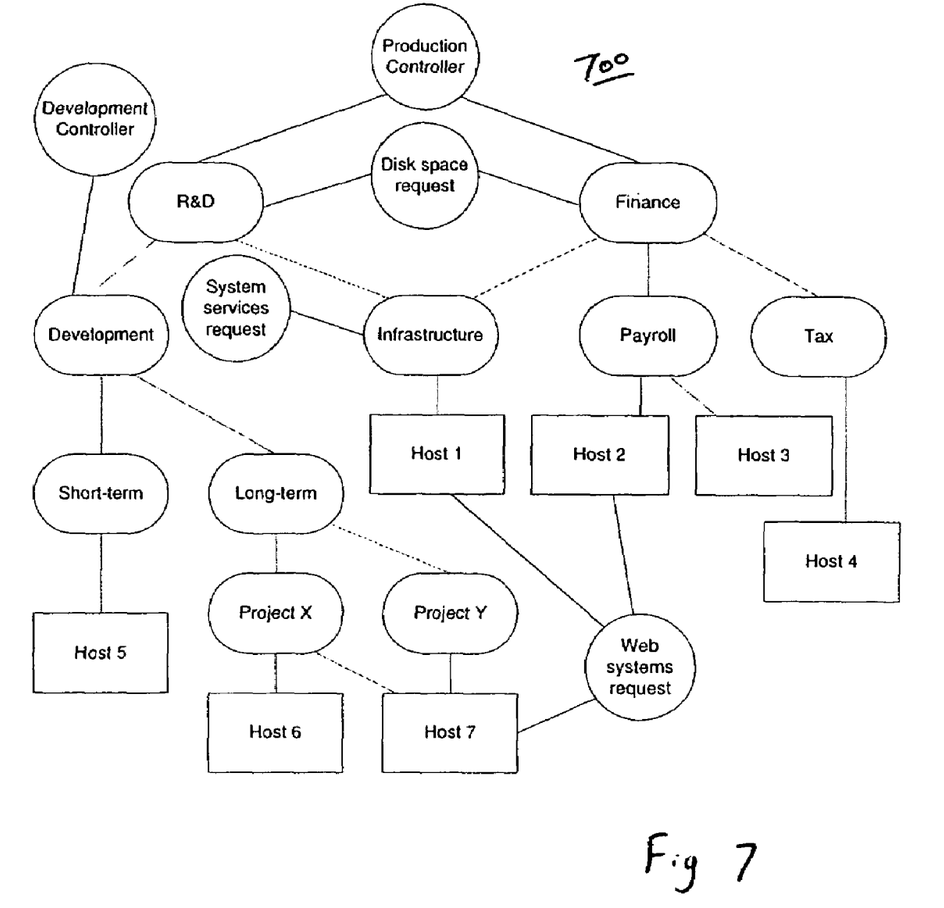
FIG. 7 illustrates another block diagram of a controller module architecture according to embodiments of the invention.

FIG. 7 shows the divisional view 700 of FIG. 6 with assignations of two types of control directives, controllers 108 and requests. Control directives are shown as circles. In addition to control directives, a Controller may return a pointer to a subsidiary Controller. In this situation, this subsidiary Controller will be queried in the same manner as the primary Controller to obtain further control directives and possibly pointers to further subsidiary Controllers. This process will continue until all Controllers have been queried. Note that a user may assign control directives to any node, and that multiple assignations of the same type can be made both against the same node and within the same view. This level of flexibility is vital in allowing fine-grained control of an enterprise's environment yet still provides a user with the ability to insert control directives at the level that makes most sense.

FIG. 7 also shows two controllers 108 and three requests with their assignments. In this example, the production controller 108 is assigned to the top-level groups within the view, assuring that it is indirectly assigned to every node within the view. The development controller 108 is assigned to the development group, so that every node within the development group also obtains information from the development controller 108. The disk space request is assigned to the top-level groups within the view, assuring that it is indirectly assigned to every node within the view, while the system services request is assigned to the infrastructure group so that every node within the infrastructure group also carries out the infrastructure requests. There is also a web systems request, which is assigned to each host that runs a web server.

Figure 8:
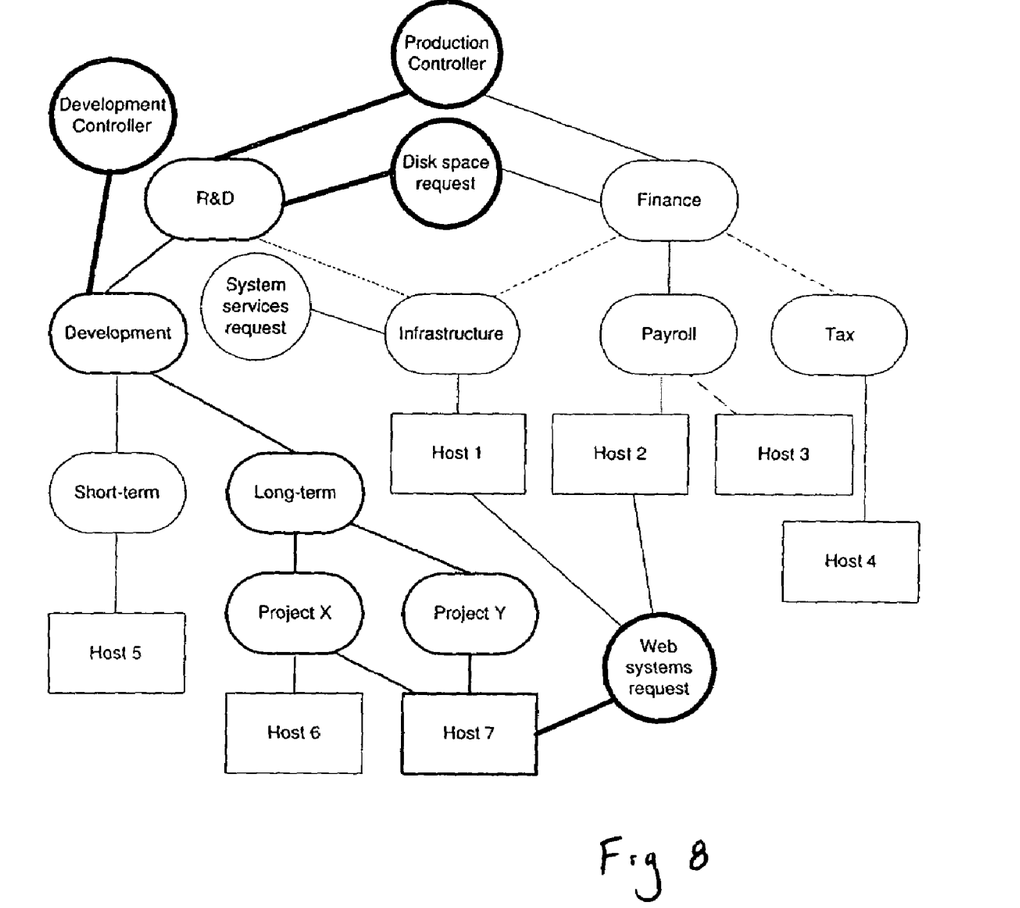
FIG. 8 illustrates the results of an attempt to obtain comprehensive information for a node in FIG. 7.

In one embodiment, there are two different classes of information related to a node that can be obtained from the controller 108. They are both based on the hierarchies within which the node exists, but are different in the manner of information that they obtain. The first class of information is "comprehensive." Comprehensive information is obtained by checking the node and all of its parents, in all views, and returning all information which is found. FIG. 8 shows the results of an attempt to obtain comprehensive information for Host 7. The control directives which match are shown in bold; note how multiple types of the same control directive are matched.

Figure 9:
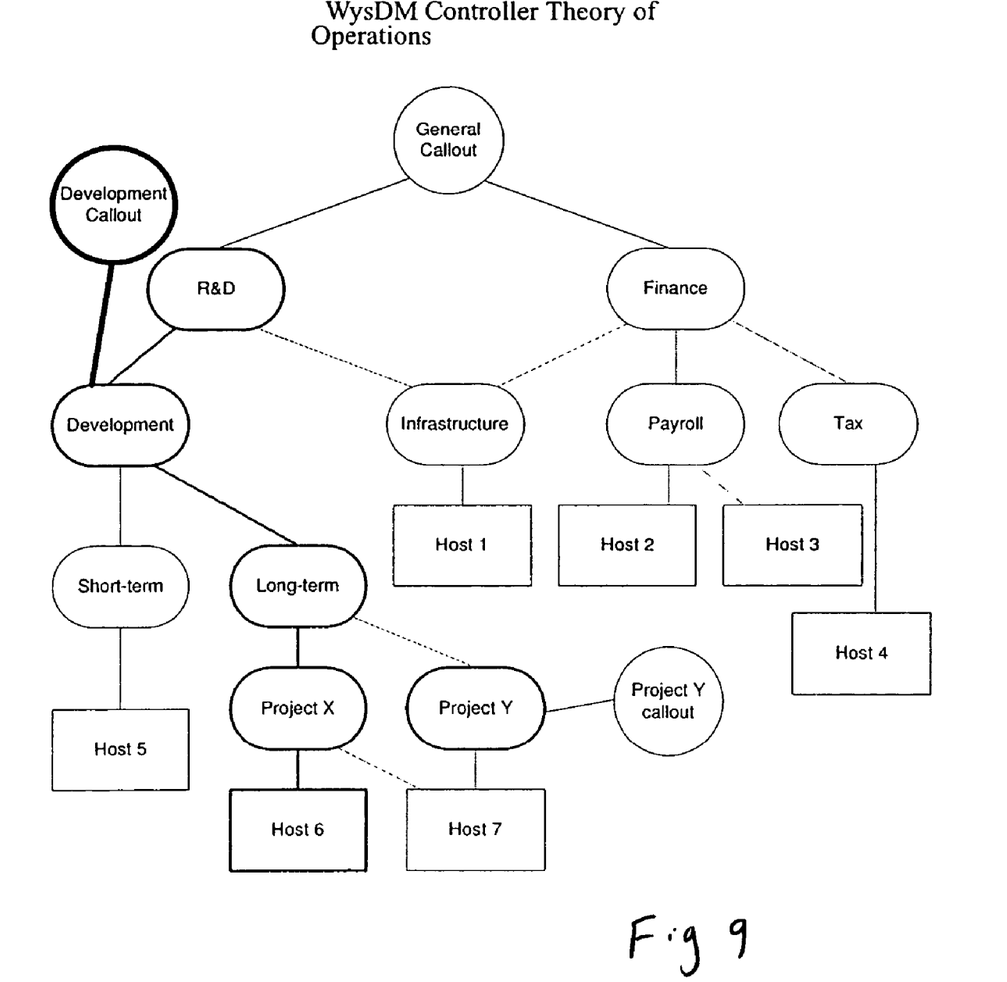
FIG. 9 illustrates the results of an attempt to obtain comprehensive information for a node in FIG. 7.

The second class of information is "specific." Specific information is obtained by checking the node and each of its parents in turn, in each view, and returning the information found closest to the node. FIG. 9 shows the results of an attempt to obtain specific information for Host 6. The ownership information which matches is shown in bold; note how only a single instance of ownership information is matched, even though there are multiple sets of ownership information assigned to parents of Host 6.

The operation of the controller 108 may be adjustable according to various parameters. The parameters may include, for example, the name of the database in which the controller 108 stores its configuration information, the password of the user who has access to the database in which the controller 108 stores its configuration information, the TCP port number of the database server on which the controller's 108 database resides, the host name of the database server on which the controller's 108 database resides, the type of database in which the controller 108 stores its configuration information, the name of the user who has access to the database in which the controller 108 stores its configuration information, the number of the TCP port to which the controller 108 connects to and listens for requests from external entities to carry out operations, and the name of the file to which log messages are written and the level of logging carried out by the controller 108.

A listener 110 is operable to 1) receive data gathered from local and remote sources via one or more collectors 108 and 2) process the data prior to insertion into the data mine 114. In one embodiment, a listener 110 may utilize a thread-pooling model in combination with a caching system in order to keep database accesses to a minimum (e.g., for managing high data processing loads in a large data environment).

A reporter 112 is a data mine 114 extraction tool and expression system. For example, a reporter 112 may generate customized charts and graphs for various users such as, for example, an operator, engineer or manager. The reporter 112 output is operable to alert a user to short or long term potential issues from, for example, a personnel performance or data infrastructure perspective. The reporter 112 may also generate alert messages according to various protocols to inform a user or selected groups of users of a potential issue.

In one embodiment, the reporter 112 gathers data for one or more time periods from one or more tables within the data mine 114 and then carries out one or more mathematical, logical and/or data mine 114 specific operations on the data before presenting it as an XML formatted output (i.e., for presentation to a user). In another embodiment, the reporter 112 may be optimized for particular queries to the data mine 114 such that the data output that is presented may be pared down in situations when, for example, very specific information is required.

The data input layer 104 comprises a collector 116 that is configured to first, collect data from both local and remote data sources 118, and then to communicate the collected data to the core server 102. As used herein, "remote data sources" 118 may include any external device or apparatus where data may be stored such as, for example, a system, network, storage device or application that is accessible by the collector 116. "Local data sources" may include any system component where data may be stored such as, for example, an operating system or an application running on an operating system. A collector 116 is a generic term for an information-gathering infrastructure which allows for obtaining data from both remote and local sources. The collector 116 provides an open API for obtaining a list of sources which the collector 116 is to monitor and also for providing the data that has been gathered. In one embodiment, the collector 116 includes the ability to obtain configuration from any number of controllers 108; gather information from any number of local sources; gather information from any number of remote sources (provided that a suitable method is available and that authentication has been pre-arranged); send information gathered to any number of listeners 110; understand the nature of multi-homed and clustered hosts and provide accurate information gathering for such systems; service ad-hoc requests and out-of-band commands; gather a subset of required information based on specific key information passed in with a request; and provide a well-defined API that allows third party developers to create their own information gathering modules. Further, the collector 116 may also include the ability to store information when a listener 110 for receiving the information is unavailable, and to re-send the information when the listener 110 is available again; cache configuration information to allow the collector 116 to start correctly even if the controller 108 is unavailable at collector 116 initialization time; and authenticate requests for information to confirm the sufficient privilege is available to carry out said request. From the perspective of the collector 116, the controller 108 is a core server component from which the collector 116 can obtain configuration information, wherein configuration information consists of a list of controllers 108, listeners 110, and requests. Further, the listener 110 is the core server component to which the collector 116 sends information which has been gathered.

Figure 10:
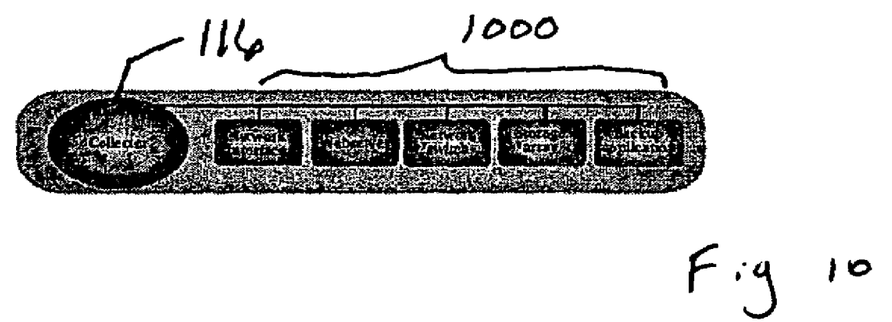
FIG. 10 illustrates an exemplary collector module architecture according to embodiments of the invention.

In one embodiment, the collector 116 may be modular such that it may include one or more specialized collection modules for each particular data source. For example, the collection modules may be independent objects which communicate with the collector 116 dynamically at run time to provide data gathering functions. An example of a controller module architecture is shown in FIG. 10 wherein the collector 116 may manage each module 1000 by, for example, communicating to each module 1000 which data to collect and when to collect data. The collector 116 may also interact with a controller 108 and/or listeners 110 to provide information on required data to the controller modules 1000. A "request" is a set of information for the collector 116 that defines a specific piece of information to be gathered. In one embodiment, the collector 116 is made up of two distinct threads of operation: a control thread and a worker thread. There is only one control thread whereas there can be any number of worker threads.

Figure 11:
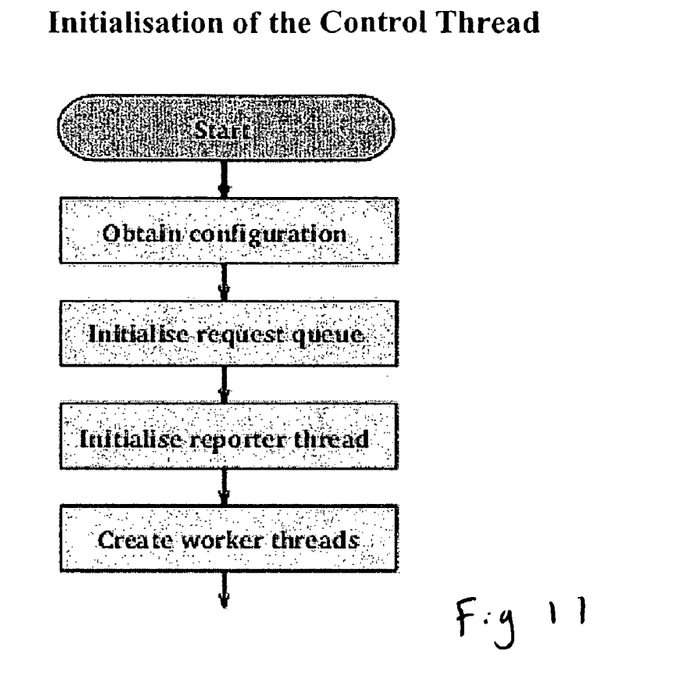
FIG. 11 is a flow diagram of an initialization stage of a collector according to embodiments of the invention.
Figure 12:
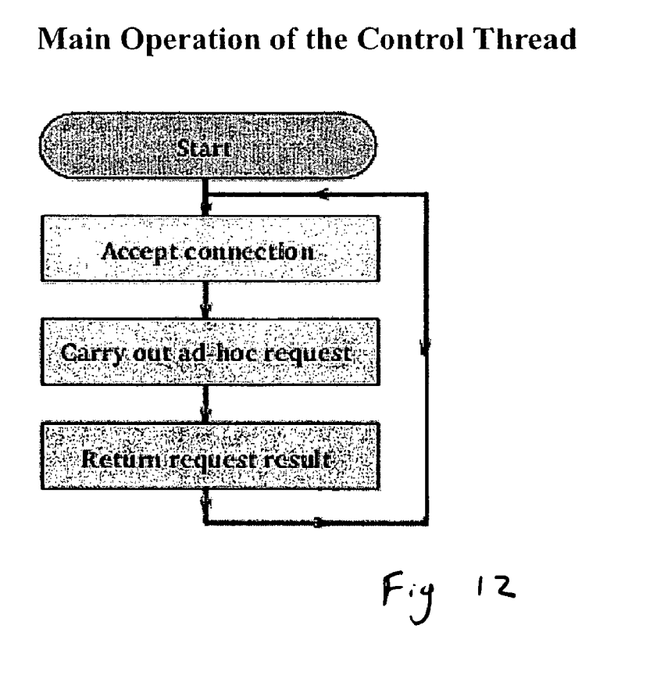
FIG. 12 is a flow diagram of a normal operation stage of a collector according to embodiments of the invention.

The control thread is responsible for all advanced functionality within the collector 116 (i.e. all functionality other than gathering information and passing it back to the listeners 110). The control thread has two distinct stages. The first is initialization stage as shown in FIG. 11. During this stage the thread obtains its configuration information, initializes the request queue, and creates the worker threads. The second and subsequent stage is normal operation, as shown in FIG. 12. During this stage the thread waits for requests from external entities. When a request arrives the thread actions the request and returns the result of the request, if any is required. Once entered, the control thread stays in the second stage for the entire lifecycle of the collector 116.

Figure 13:
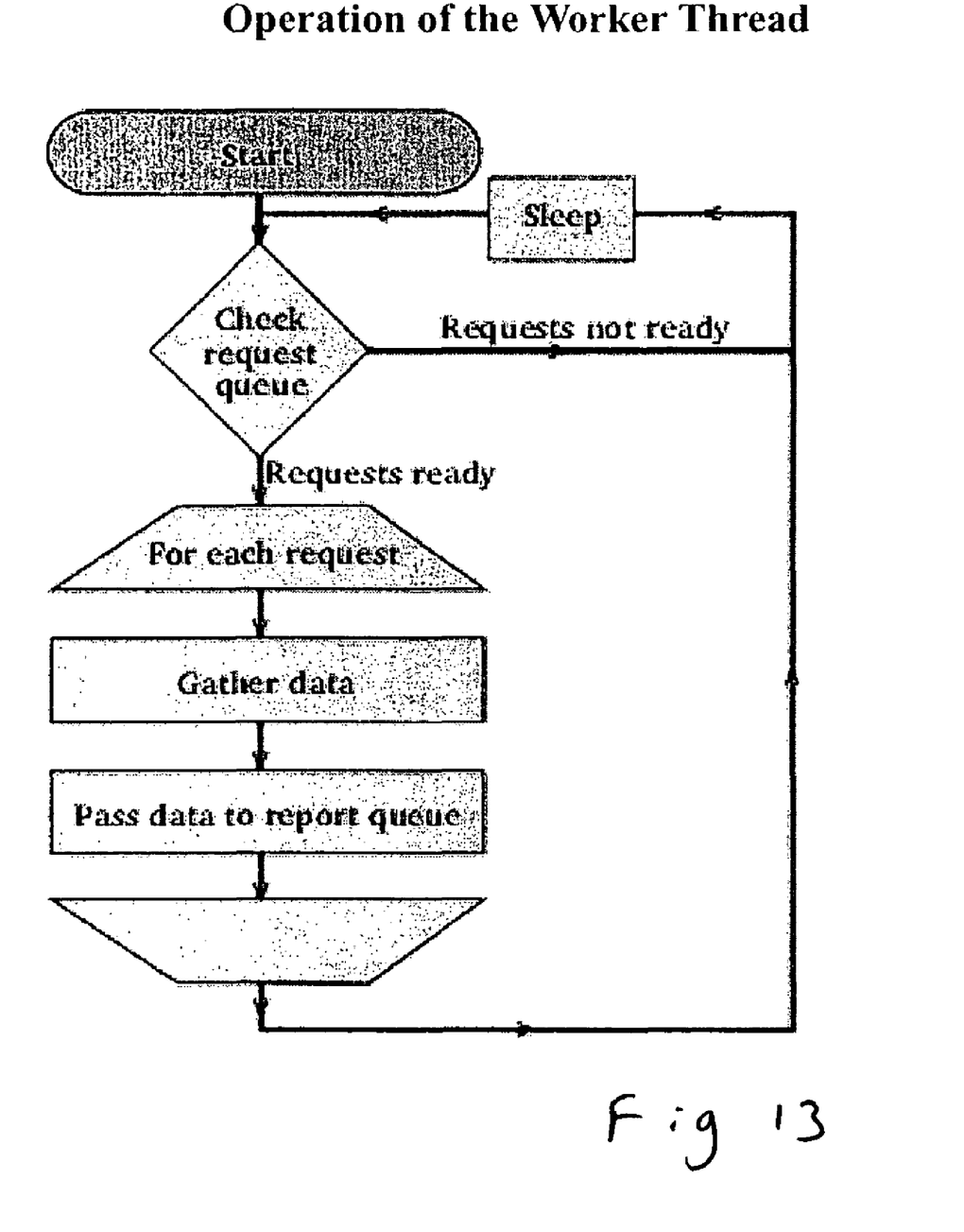
FIG. 13 is a flow diagram of a worker thread according to embodiments of the invention.

The operation of the worker thread is shown in FIG. 13. The worker thread has a single task, which is to gather information and return it to required listeners 110. The only direct interaction that the worker threads have with the control thread is when they are started or stopped. Indirect interaction is handled through a request queue, which is owned by the control thread but is used by the worker thread to obtain information on which request to action next. The control thread can add and remove entries from the request queue as a result of management commands, thereby indirectly controlling the information gathered by the worker threads.

In another embodiment, pre-defined requests are available to the collector 116 through information gathered from controllers 108 during the initialization phase. At the end of initialization, the collector 116 will have a list of requests along with details on the period at which the interval should be run and the listeners 110 which require the resultant information. These requests are held in a queue that is position-dependent based on both the time at which the request is next due to be actioned and the absolute priority of the request, as supplied in the request configuration.

During initialization, the collector 116 will also start a number of worker threads to handle requests on the request queue. Each idle thread will periodically attempt to obtain the next suitable entry from the queue. If there are no suitable entries on the queue, either because all entries are currently being serviced or because no entry is due to be actioned at the current time, the thread will go back to sleep. If a request is on the queue and ready to be actioned then the thread will remove that entry from the queue and action it. Once the request has been fully actioned and the resultant information passed back to the listeners 110, the request is re-scheduled for a future time according to its period and placed back on the request queue.

In another embodiment, "ad-hoc" requests are available to the collector 116 through a network port which the collector 116 opens on initialization. Ad-hoc requests are handled by the collector's 116 control thread, and as such it is only possible to run one ad-hoc request at a time. An ad-hoc request is carried out in the same way as a pre-defined request, with the exception that once the information has been gathered it is not sent to any listeners 110. Instead, the information is returned back to the process which connected to the collector 116 and issued the request.

Management commands are available to the collector 116 through the same network port as used for ad-hoc request handling. A management command controls the configuration of the collector 116, and allows for alteration of the collector's 116 operational parameters. Examples of management commands are asking the collector 116 to reload its pre-defined request list, and to change the level of logging that the collector 116 carries out when obtaining information.

Management commands are handled in the same way as ad-hoc requests, however they do not obtain information and, as such, the only response received by the process which connected to the collector 116 and issues the command is a response code once the command has been accepted. In addition to the commands and requests, the operation of the controller 108 may be adjusted according to various parameters which may control, for example, the maximum number of requests that the collector 116 will attempt to run simultaneously; the name of the initial host to which the collector 116 connects when attempting to obtain configuration information; the number of the TCP port on the initial host to which the collector 116 connects when attempting to obtain configuration information; the number of the TCP port to which the collector 116 connects to and listens for requests from external entities to carry out operations, such as ad-hoc requests or commands; the name of the file to which log messages are written; and the level of logging carried out by the collector 116.

The design of the collector 116 may be based on a thread-pool design that allows for flexibility for expanding from a local collection component to a component that may collect data from a large collection of remote sources through one or more protocols such as SNMP, WMI and other application-specific protocols. It should be noted that as an alternative to the collector 116, data collection may be performed remotely by, for example, a third-party data collection application or a data collection application that is proprietary to a particular user.

The components of the data processing/output layer 106 access selected data from the core server 102 in a data extraction process and generate an output that is based at least in part on the selected data. In one embodiment, the data processing/output layer 106 comprises a predictive analysis engine (PAE) 120. The PAE 120 provides application and correlation analysis capabilities by, for example, continuously scanning data from the data mine 114 and searching for performance variances and other patterns based on pre-determined and/or user selectable attributes.

The PAE 120 must provide an open API for running analyses and reporting the results to allow for maximum flexibility when connecting with third-party or in-house applications.

The PAE 120 may include the ability to follow a given rule set and carry out required data mining, analysis, and condition evaluation and recognize alert conditions as laid out in a given rule set. The PAE 120 may further log the resultant alert to one or more data mines 114 through interfacing with a listener 110, or to one or more entities through SMTP email or SNMP traps. The PAE 120 may also prioritize a set of outstanding analyses such that certain analyses run ahead of others and obtain predictions of future values of a dataset and provide the information in the same format as that provided by the reporter 112 to aid in graphing of predicted values.

Figure 14:
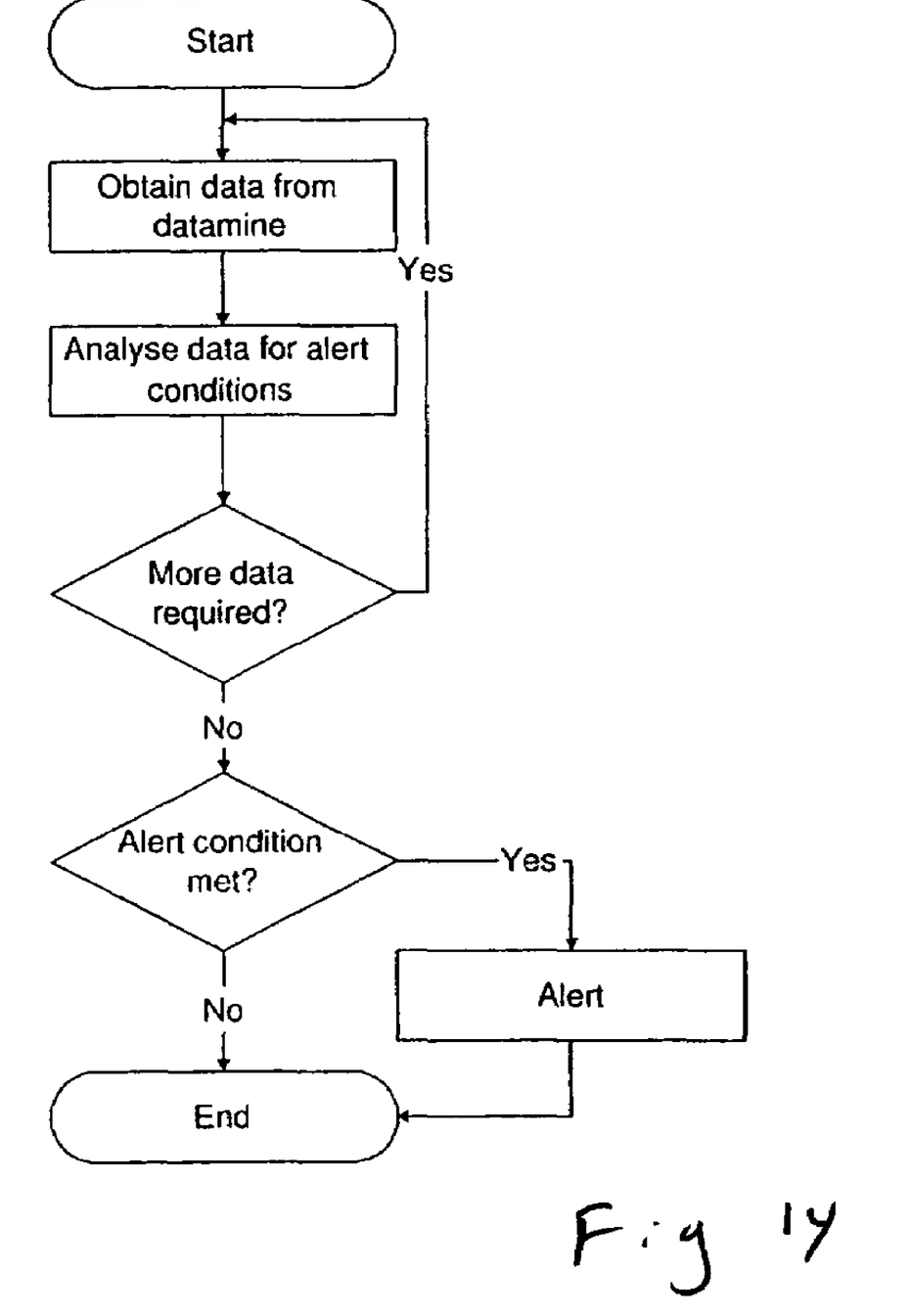
FIG. 14 is a flow diagram illustrating the structure of a PAE according to embodiments of the invention.

The structure of the PAE 120 is shown in FIG. 14. The structure shows the iterative nature of the PAE 120, where the results of an analysis might require a new dataset to be gathered and analyzed. There is no limit to how far the PAE 120 can iterate, although practical limits will exist due to processing, memory, and storage constraints on the host running the PAE 120.

It is important to note that the PAE 120 has no notion of state. Hence if an analysis is run and returns an alert then the next run of the same analysis will also provide an alert, assuming that there have been no changes to the managed environment in the meantime.

The PAE 120 utilizes the reporter 112 for gathering datasets from the data mine 114. As such it has access to the full functionality of the reporter 112 and can obtain subsets of data within the data mine 114 in many different ways.

In the various embodiments, the PAE 120 is capable of a number of different types of analysis. These types are examined in detail below.

"Direct analysis" is the act of taking the current value of a data series and comparing it to a pre-set threshold. This method, otherwise known as "exception-based monitoring", is a relatively simple way of finding problems in a system but remains the most commonly used method of systems monitoring and allows easy integration with most major monitoring infrastructures. In addition, direct analysis can be used as the first point in a more complex analysis as it is computationally very cheap to carry out.

An example of direct analysis would be checking the amount of bandwidth used on a port of a network switch to see if it is above a pre-set 'critical' level (e.g. above 80 Mb/s). This is a common method used by network engineers to be alerted of a network congestion problem as it occurs.

"Predictive analysis" is the act of taking the past and current values of a data series and using them to predict the future values in that series. This method, otherwise known as "trending", is a powerful way to spot many kinds of problems before they occur, allowing preventative maintenance to take place at a suitable time well ahead of an outage that would otherwise occur.

There are a number of different types of trends that can be used in predictive analysis. Examples of various trends that the PAE 120 may recognize and utilize are detailed below.

Linear trending attempts to fit a dataset to a straight line. Linear trending is applicable in many situations where normal operation of a system involves a simple increase in utilization of a fixed resource. Examples of such situations are disk space filling up due to application logging and free memory declining due to a memory leak in application code.

Quadratic trending attempts to fit a dataset to a polynomial curve of order n. Quadratic trending is applicable in situations where positive feedback loops exist within utilization of a resource. An example of such a situation is process context swaps on a host that is struggling under increasing load as more processes are started by impatient users waiting for a response.

Sawtooth trending attempts to fit a dataset to a sawtooth pattern of rising values that drop periodically to a much lower value before starting the rise again. Sawtooth trending is applicable in situations where peak and average utilization of a resource follow two separate trends. Examples of such situations are disk space on a database server which dumps its database each night and then compresses it, and tape utilization on a backup server which carries out weekly fulls and daily incrementals with a one-month retention period. In each case, the peak utilization of the resource is way above the average utilization and it is important to monitor the peaks utilization separately to obtain a useful trend.

Application trending attempts to fit a dataset to an application-specific curve. Application-specific curves may be defined in modules and account for cases where standard trending models are inadequate to model the profile of utilization.

An example of predictive analysis would be checking the number of errors on a port of a network switch to see if it is increasing and likely to reach a critical threshold in the near future (e.g. more than 5% of packets received by the port are rejected due to errors). This could point to on-going degradation of a physical component such as a network fibre or host NIC, or a faulty network partner that is generating increasing numbers of bad packets over time.

"Inference analysis" is the act of taking current values of multiple datasets and applying logical operations to the data to obtain logical differences or similarities. This method is a way of spotting problems that involve the interaction of multiple devices and are generally impossible to establish from the view at a single device.

An example of inference analysis would be comparing the speed and duplex of a port of a network switch to the same parameters on the host to which the port is connected. A mismatch of these values between the two entities would cause serious problems when attempting to communicate with the host at high speeds, even though from looking at the host or the switch by themselves they would appear to be configured correctly.

"Time analysis" is the act of taking past and current values of a datasets and comparing areas over specific intervals to check for changes over time. This method is a way of spotting things such as performance degradation where the degradation has a complex, or unknown cause but the effect clearly shows that there is a significant change from normal operation. Time analysis is often used in combination with inference analysis to provide a comprehensive cause and effect system.

An example of time analysis would be comparing the throughput of a port on a network switch compared to the same time a week previously. A significant drop in throughput does not point to a network problem in itself, but might highlight the fact that a weekly data transfer process involving the host has not run due to a problem with the batch process preceding the transfer.

The PAE 120 has a full range of conditional abilities available to it when evaluating conditions. Examples of specific types of conditional abilities are described in detail below.

Logical conditions available to the PAE 120 include a number of standard logical comparators such as =, !_, >, >_, etc. String conditions available to the PAE 120 include the "equals", "begins with", "contains", and "ends with" operators.

Comparison conditions available to the PAE 120 are extensive, and can be broken down by the type of analysis in which they are primarily used.

The comparisons for direct analysis are similar to those for logical conditions, in that they act on a single value.

The comparisons for predictive analysis are based around when a series will reach a particular value, and when two series will reach the same value.

The comparisons for inference analysis are a chain of logical conditions with extra analysis steps after each condition depending on the result of the comparison.

The comparisons for time analysis are a superset of the logical conditions, and contain extra operators on the data such as 'percentage of' and 'increased by'.

A vital part of the PAE 120 is its ability to communicate its findings to the outside world. There are a number of ways in which the PAE 120 can accomplish this, and these are described in detail below.

The simplest thing to do with the results of any analysis is to place them back in the data mine 114. This allows the use of the reporter 112 or other similar software to collate and display the information in whatever form is suitable to the user carrying out the reporting.

Data mine 114 logging of analysis results is considered a good solution to storing the information produced by the PAE 120, however, as the information is not actively injected into an external system it is not suitable by itself for areas where 24×7 monitoring is required.

Data mine 114 logging follows logging known fields into a part of the data mine 114 designed to handle analysis results. There is little flexibility in the logging format due to the standardized nature of the data mine 114.

Email alerts allow for information on the results of analysis to be sent to one or more specified email addresses.

Email alerting is used in many companies as a way to allow administrators to keep abreast of status information or potential problems. Email alerting allows for a large amount of flexibility in the way that analysis results are displayed due to their simple text-based nature and lack of formatting requirements of the recipient.

A Simple Network Management Protocol (SNMP) traps allow for information on the results of analysis to be sent to a number of SNMP-enabled hosts. These hosts often form part of a larger monitoring infrastructure which will involve problem tracking and escalation.

SNMP traps are used in the vast majority of companies whose large data centers and round-the-clock operations require 24×7 monitoring and immediate response to problems. SNMP traps allow for a certain amount of flexibility in the way that analysis results are displayed. However, most SNMP trap receivers have a specific required format in which information must be received for the trap to be accepted and as such the flexibility of information supplied in the SNMP traps is dependent on the receiver to which the trap is sent.

In addition to all of these methods, the PAE 120 may also report the results of ad-hoc analysis requests directly back to the requesting process. This allows for maximum flexibility when interacting directly with the PAE 120 as all of the raw results of the analysis are presented and the requesting process is free to use these results for whatever future processing is required.

Each alert contains a number of parameters which are sent to the system receiving the alert. The specific way in which the parameters are passed depends on the transport being utilized, however the parameters are the same regardless. The parameters may include a string specifying this alert. No two separate alerts preferably will ever have the same ID.

The PAE 120 is operable to interact with various other data processing/output layer 106 components such as a publisher 122 and a graphical user interface (GUI) 124. For example, the output produced by the publisher 122 and GUI 124 may be for human viewing such as a graph, email, or web page, or for further processing (e.g., an SNMP trap) to provide/extract additional data mine 114 information. As with the data input layer 102, the data output layer 106 may be implemented by, a third-party data output application or a data output application that is proprietary to a particular user. As such, in one embodiment, the core server components are operable to interact with third party and proprietary data output layer components.

Although the invention has been described in terms of various embodiments, it is not limited thereto. Rather, the appended claims should be construed broadly to include other variants and embodiments of the invention which may be made by those skilled in the art without departing from the scope and range of equivalents of the invention.

What is claimed is:

1. A method of data management for a distributed network of data sources, the method comprising:

providing a distributed network, the distributed network comprising a plurality of data sources comprised of a plurality of linked and independent, unlinked nodes;

identifying and fixing performance and capacity management related issues, generating and identifying trends of resource utilization over time within the distributed network, by performing the steps of:

monitoring the plurality of linked and independent, unlinked nodes, wherein each node comprises a portion of a hierarchy of nodes, wherein at least one set of nodes is arranged in multiple hierarchies;

obtaining data from the at least one set of nodes arranged in multiple hierarchies;

storing the data from the at least one set of nodes in at least one data structure in accordance with a predetermined data structure configuration;

receiving at least one parameter associated with selected data from the data structure and associated with the at least one set of multiple linked and unlinked nodes arranged in multiple hierarchies;

correlating the selected data from the at least one set of multiple linked and unlinked nodes;

predicting an impact on each node and the multiple hierarchies associated with the at least one set of nodes, the impact created by a change to another node, the prediction based on the selected data and the correlation; and processing the selected data to generate an output, wherein the output is based at least in part on the selected data, the associated multiple nodes, and the predicted impact, wherein the output is separable to indicate a predicted impact and associated output for each of the multiple hierarchies.

2. The method of claim 1, wherein the data may be obtained from at least one of a remote system, network, application or storage domain.

3. The method of claim 1, wherein the predetermined data structure configuration is based on an organizational hierarchy.

4. The method of claim 1, wherein the at least one data structure comprises a relational database.

5. The method of claim 1, wherein the at least one data structure is configured for SQL applications.

6. The method of claim 1, wherein the at least one parameter includes at least one user-defined attribute.

7. The method of claim 1, wherein the at least one parameter is received by the controller of the system of data management in XML format.

8. The method of claim 1, wherein the at least one predefined parameter is based on information available from the plurality of remote data sources and associated with a predetermined data selection for a particular user.

9. The method of claim 1, wherein the at least one parameter is associated with at least one future predictive analysis operation related to trends of resource utilization and estimation of the future utilization of any data source, the predictive analysis operation carried out by the use of historical information and statistical and logical operations.

10. The method of claim 1, wherein the selected data spans a plurality of data structures.

11. The method of claim 1, wherein processing the selected data includes coding the data in XML format.

12. The method of claim 11, wherein the selected data is coded in a compressed XML format when the amount of selected data exceeds a predetermined threshold.

13. The method of claim 1, wherein processing the selected data includes correlating the selected data with the at least one parameter.

14. The method of claim 1, wherein processing the selected data includes performing at least one mathematical or logical operation.

15. The method of claim 1, wherein processing the selected data includes correlating the selected data with at least one time period parameter.

16. The method of claim 1, wherein the output is generated for presentation via a user interface.

17. The method of claim 1, wherein the output includes at least one of an email or SNMP alert.

18. The method of claim 1, wherein the output is generated for additional processing.

19. A system of data management for a distributed network of data sources, the system comprising:

a plurality of data sources comprised of a plurality of linked and independent nodes, wherein each node comprises a portion of a hierarchy of nodes, wherein at least one set of nodes is arranged in multiple hierarchies;

a collector for monitoring and obtaining data from the at least one set of nodes arranged in multiple hierarchies;

a data mine for storing the data from the at least one set of nodes;

a listener for processing the data from the at least one set of nodes in accordance with a predetermined data structure configuration, the listener for further inserting the processed data into the data mine;

a controller for receiving at least one parameter associated with selected data from the data structure and associated with the at least one set of multiple linked and unlinked nodes arranged in multiple hierarchies from the data mine, wherein the controller contains a data structure for storing control and configuration information associated with accessing the data mine;

a reporter for correlating the selected data from the at least one set of multiple linked and unlinked nodes a predictive analysis engine in communication with the data mine, wherein the predictive analysis engine generates and identifies trends of resource utilization over time and predicts an impact on each node and the multiple hierarchies associated with the at least one set of nodes, the impact created by a change to another node, the prediction based on the selected data and the correlation within a distributed network of data sources, and wherein the predictive analysis engine provides the analysis to the reporter; and wherein the reporter further generates an output, wherein the output is based at least in part on the selected data, the associated multiple nodes, and the predicted impact, wherein the output is separable to indicate a predicted impact and associated output for each of the multiple hierarchies.

20. The system of claim 19, wherein the collector includes a plurality of modules for obtaining data from each of a plurality of remote data sources.

21. The system of claim 19, wherein the collector may obtain data from at least one of a remote system, network, application or storage domain.

22. The system of claim 19, wherein the configuration of the data mine is based on an organizational hierarchy.

23. The system of claim 19, wherein the data mine comprises at least one relational database.

24. The system of claim 19, wherein the data mine is configured for SQL applications.

25. The system of claim 19, wherein the at least one parameter includes at least one user-defined attribute.

26. The system of claim 19, wherein the at least one parameter is received in XML format by the controller of the system of data management.

27. The system of claim 19, wherein the at least one parameter is associated with a predetermined data selection for a particular user and wherein the at least one parameter is pre-defined based on information available from the plurality of remote data sources.

28. The system of claim 19, wherein the at least one parameter is associated with at least one future predictive analysis operation related to estimation of the future utilization of any node, wherein the predictive analysis operation is carried out using historical information and statistical and logical operations gathered from the plurality of remote data sources.

29. The system of claim 19, wherein the selected data spans a plurality of data structures within the data mine.

30. The system of claim 19, wherein the reporter processes the selected data by coding the selected data in XML format.

31. The system of claim 30, wherein the reporter codes the selected data in a compressed XML format when the amount of selected data exceeds a predetermined threshold.

32. The system of claim 19, wherein the reporter correlates the selected data with the at least one parameter.

33. The system of claim 19, wherein the reporter processes the selected data by performing at least one mathematical or logical operation.

34. The system of claim 19, wherein the reporter processes the selected data by correlating the selected data with at least one time parameter.

35. The system of claim 19, further comprising a publisher for generating a report based at least in part on the output for presentation to a user.

36. The system of claim 19, wherein the output includes at least one of an email or SNMP alert.

37. The system of claim 19, wherein the reporter generates the output for additional processing.

38. The system of claim 19, wherein the predictive analysis component generates an alert associated with the correlation of the output with the previously selected data.

39. The system of claim 38, wherein the alert is one of an email or SNMP alert.

40. An information management system for a distributed network of data sources, the system comprising:

a plurality of data sources comprised of a plurality of linked and unlinked nodes in a distributed network, wherein each node comprises a portion of a hierarchy of nodes, wherein at least one set of nodes is arranged in multiple hierarchies;

at least one monitoring and gathering process for monitoring and obtaining information from the at least one set of nodes arranged in multiple hierarchies;

at least one storage process for storing said information obtained from the at least one set of nodes in a data structure in accordance with previously stored configuration parameters;

at least one controlling process adapted to communicate, user-selected information to be gathered, the at least one controlling process adapted for receiving at least one configuration parameter associated with selected data from the data structure and associated with a the at least one set of multiple linked and unlinked nodes arranged in multiple hierarchies from the at least one storage process;

at least one extraction process for (i) correlating the selected data from the at least one set of multiple linked and unlinked nodes, (ii) predicting and impact on each node and the multiple hierarchies associated with the at least one set of nodes, the impact created by a change to another node, the prediction based on the selected data and the correlation, and (iii) generating an output, wherein the output is based at least in pact on the selected data, the associated multiple nodes, and the predicted impact, wherein the output is separable to indicate a predicted impact and associated output for each of the multiple hierarchies.

41. The system of claim 19, wherein the data mine, listener and controller run on top of a database abstraction layer.

42. The system of claim 19, further comprising a predictive analysis engine in communication with the reporter, wherein the predictive analysis engine continuously scans data from the data mine and searches for performance variations based on user-selected attributes.

43. The system of claim 19, wherein the controller stores and provides information on a hierarchy of nodes that make up an enterprise, wherein these nodal hierarchies control data gathering and reporting operations, wherein the controller contains data regarding the type and structure of information available within the data mine.

44. The system of claim 19, wherein the controller stores information regarding the type and structure of data that is available at a given time in the data mine.

45. The system of claim 40, wherein the node represents one of a physical device, a logical device or a logical group.

46. The system of claim 40, wherein the nodes comprise a plurality of independent views.

47. The system of claim 46, wherein the system predicts the impact on a view created by a change to another, independent view.

* * * * *